United States Patent

Kolb et al.

(12) United States Patent
(10) Patent No.: US 6,221,525 B1
(45) Date of Patent: Apr. 24, 2001

(54) ELECTROCHEMICAL CELL HAVING A DOPED ELECTROLYTE AND ASSOCIATED FABRICATION AND ELECTROCHEMICAL PROCESSES

(75) Inventors: Eric S. Kolb; Denis G. Fauteux, both of Acton, MA (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/362,829

(22) Filed: Jul. 28, 1999

(51) Int. Cl.[7] .............................. H01M 6/30; H01M 6/14
(52) U.S. Cl. ..................... 429/110; 429/300; 429/302; 429/303
(58) Field of Search ................................ 429/300, 302, 429/303, 307, 309, 313, 110

(56) References Cited

U.S. PATENT DOCUMENTS

| | | | |
|---|---|---|---|
| 4,556,614 | 12/1985 | le Mehaute et al. | 429/191 |
| 4,654,279 | 3/1987 | Bauer et al. | 429/192 |
| 4,818,643 | 4/1989 | Cook et al. | 429/188 |
| 4,888,257 | 12/1989 | Narang | 429/192 |
| 5,853,917 | * 12/1998 | Fauteux et al. | 429/218.1 |

* cited by examiner

Primary Examiner—Laura Weiner
(74) Attorney, Agent, or Firm—Factor & Partners

(57) ABSTRACT

An electrochemical cell comprising a first electrode and a second electrode, an electrolyte, and a dopant associated with the electrolyte, wherein the dopant comprises a reservoir for controllably releasing salt into the electrolyte. The dopant further comprises means for controllably regulating internal pressure of the electrochemical cell as well as means for substantially precluding dendrite formation within the electrochemical cell.

29 Claims, 2 Drawing Sheets

ELECTROCHEMICAL CELL HAVING A DOPED ELECTROLYTE AND ASSOCIATED FABRICATION AND ELECTROCHEMICAL PROCESSES

BACKGROUND OF THE INVENTION

1. Field of the Invention

The present invention relates in general to electrochemical cells, and more particularly, to an electrochemical cell having a dopant associated with an electrolyte. The dopant, among other things, controllably releases salt into the electrolyte, substantially precludes dendrite formation within the cell, controllably regulates internal pressure of the cell, and increases mechanical integrity of the electrolyte.

2. Background Art

Lithium based electrochemical cells have been known in the art for several years. Furthermore, lithium based electrochemical cells having liquid, gel, and/or polymeric electrolytes are likewise well known. While cells utilizing such electrolytes have exhibited some promising electrochemical performance characteristics, numerous deficiencies and/or problems associated with conventional electrolytes nevertheless persist. For example, dendrites can form near the electrode/electrolyte interface, which, over time, shorts the cell thereby rendering it inoperable. In addition, during cell operation, conventional electrolytes become polarized due to depletion of salts within the electrolyte. Unfortunately, conventional electrolyte systems do not have an internal mechanism for re-supplying salt once it has been depleted within the cell. Furthermore, the performance of an electrochemical cell depends greatly upon its internal setup. Specifically, to ensure proper electrode contact, the cell must maintain a certain internal pressure to keep, for example, the electrode active material in proper contact with the current collector. Conventional electrolytes do not provide an internal mechanism for regulating the internal pressures of the cell. Moreover, conventional liquid and gel electrolytes generally have low viscosities, thereby making them difficult to coat onto an electrode without deformation prior to curing.

It is therefore an object of the present invention to provide an electrochemical cell having an electrolyte doped with an agent to remedy, among other things, the aforementioned short comings associated with conventional electrolytes.

SUMMARY OF THE INVENTION

The present invention is directed to an electrochemical cell comprising: (a) a first electrode and a second electrode; (b) an electrolyte; and (c) a dopant associated with the electrolyte, wherein the dopant comprises a reservoir for controllably releasing salt into the electrolyte.

In a preferred embodiment of the invention, the electrochemical cell further comprises means for controllably regulating internal pressure of the electrochemical cell. In this embodiment the pressure regulating means comprises the dopant.

In another preferred embodiment of the invention, the electrochemical cell further comprises means for substantially precluding dendrite formation within the cell. In this embodiment the dendrite preclusion means comprises the dopant.

The present invention is also directed to an electrochemical cell comprising: (a) a first electrode and a second electrode; (b) an electrolyte; and (c) a dopant associated with the electrolyte, wherein the dopant comprises means for controllably regulating internal pressure of the electrochemical cell.

In a preferred embodiment of the invention, the electrochemical cell further comprises means for controllably releasing salt into the electrolyte. In this embodiment the salt releasing means comprises the dopant.

In another preferred embodiment of the invention, the electrochemical cell further comprises means for substantially precluding dendrite formation within the cell. In this embodiment, the dendrite preclusion means comprises the dopant.

The present invention is further directed to an electrochemical cell comprising: (a) a first electrode and a second electrode; (b) an electrolyte; and (c) a dopant associated with the electrolyte, wherein the dopant comprises at least one of: (1) a reservoir for controllably releasing salt into the electrolyte; (2) means for controllably regulating internal pressure of the electrochemical cell; and (3) means for substantially precluding dendrite formation within the cell.

In yet another preferred embodiment of the invention, the dopant is selected from at least one of the group consisting essentially of poly(methyl methacrylate), lithium polysilicate, and mixtures thereof.

Preferably, the reservoir of the dopant may contain a salt selected from at least one of the group consisting essentially of $LiAsF_6$, $LiPF_6$, $LiCF_3SO_3$, $LiN(CF_3SO_2)_3$, $LiBF_4$, $LiClO_4$, and mixtures thereof The concentration of the dopant may range from approximately 0.5% to approximately 50% by weight of the electrolyte and preferably ranges from approximately 2% to approximately 25% by weight of the electrolyte.

In a preferred embodiment of the invention, the molecular weight of the poly(methyl methacrylate) ranges from approximately 750,000 to approximately 1,000,000.

The present invention is additionally directed to an electrochemical cell comprising: (a) a first electrode and a second electrode; (b) an electrolyte; and (c) means for maintaining conductivity of the electrolyte in the present of a dopant. In this embodiment the conductivity maintaining means comprises the dopant comprising lithium polysilicate.

The present invention further provides a process for fabricating an electrochemical cell comprising the steps of: (a) fabricating a first electrode and a second electrode; (b) associating a dopant with an electrolyte, wherein the dopant comprises a reservoir for controllably releasing salt into the electrolyte; (c) controllably applying the electrolyte to at least a portion of the first electrode; (d) associating a second electrode with the electrolyte; and (e) at least partially curing the electrolyte.

The present invention is also directed to an electrochemical process within an electrochemical cell comprising the steps of: (a) cycling an electrochemical cell having a first electrode, a second electrode, an electrolyte comprising a salt, and a dopant associated with the electrolyte; (b) consuming a portion of salt within the electrolyte; and (c) controllably releasing a salt from the dopant into the electrolyte.

In a preferred embodiment of the invention, the process, further comprises the step of controllably regulating the internal pressure of the electrochemical cell and/or substantially precluding dendrite formation within the electrochemical cell.

BRIEF DESCRIPTION OF THE DRAWINGS

The invention will now be described with reference to the drawings wherein.

DETAILED DESCRIPTION OF THE DRAWINGS

Figure 1:
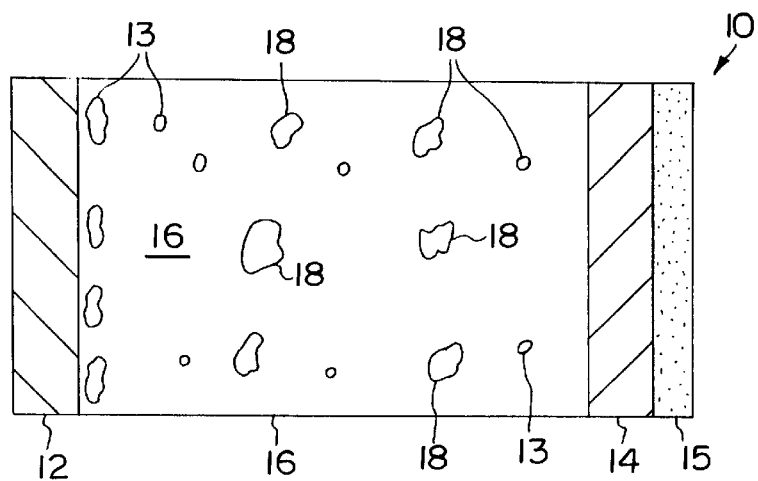
FIG. 1 of the drawings is a schematic representation of an electrochemical cell fabricated in accordance with the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Referring now to the drawings and to FIG. 1 in particular, electrochemical cell 10 is shown, which comprises first electrode 12, second electrode 14, electrolyte 16, and doping agent or dopant 18. For purposes of the present disclosure, first electrode 12 comprises an anode. Of course, in a secondary cell configuration, the anode and cathode will become interchangeable with each other, depending on whether the cell is in a state of charging or discharging. First electrode 12 preferably comprises a carbonaceous active material layer, such as graphite, carbon black, or mixtures thereof, which is applied to, for example, a copper current collector.

Second electrode 14 is a cathode and preferably comprises an active material layer fabricated from one or more lithium transition metal oxides, such as $LiNiO_2$, $LiCoO_2$, and $LiMn_2O_4$, which is applied to, for example, aluminum current collector 15. While specific transition metal oxides have been disclosed, for illustrative purposes only, any one of a number of metallic species are likewise contemplated for use. It will be understood that the composition of second electrode 14 must be electrochemically compatible with the remainder of the cell, including first electrode 12, electrolyte 16, and dopant 18. It will be further understood that first and second electrodes 12 and 14, respectively, can be fabricated from any one of a number of conventional electrode materials, including non-lithium based electrode materials.

Preferably, electrolyte 16 includes a conventional salt, such as $LiAsF_6$, $LiPF_6$, $LiCF_3SO_3$, $LiN(CF_3SO_2)_3$, $LiBF_4$, or $LiClO_4$ dissolved in a conventional solvent, such as propylene carbonate (PC), ethylene carbonate (EC), diethyl carbonate (DEC), dimethyl carbonate (DMC), or polyethylene oxide polymer (PEO), although other commercially available and conventionally used solvents and salts or electrolyte systems (such as liquid, gel, and polymeric systems) as would be known to those having ordinary skill in the art having the present disclosure before them are likewise contemplated for use.

Dopant 18 is associated with electrolyte 16 and may be fabricated from, for example, poly(methyl methacrylate) (PMMA), which is commercially available from Aldrich Chemical Co., of Milwaukee, Wis. PMMA comprises the chemical structure identified below:

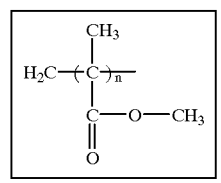

n = an interger such that the Mw is approximately 750,000–1,000,000

In addition, dopant 18 may also comprise a specialized form of lithium polysilicate (LPS). In particular spray dried lithium polysilicate is preferred and is fabricated according to the procedure provided herein below. Conventional, commercially available lithium polysilicate is treated by a Yamato Spray Drier (Model GB22) under the following conditions: Atomizing air (1.5 kg/cm$^2$); Inlet temperature (150° C.); Outlet temperature (80° C.); Pump feed rate (6.16 ml/min); Drying air setting (0.33 m$^3$/min or greater); and a Lithium Polysilicate solution of approximately 5%.

Once the material has been sprayed out, particle sizes will be less than 100 microns and will be substantially spherical in shape—which can enhance the rheological properties of the dopant.

It should be noted that when LPS is used as the dopant a counter intuitive result is observed relative to electrolyte conductivity. Conventional logic would predict that the conductivity of the electrolyte would decrease and the concentration of the dopant increases. To the contrary, when LPS is used, it has been observed that electrolyte conductivity remains substantially constant regardless of its concentration. Indeed, in support of this finding, four electrolytes were prepared (as identified in Table 1.0) and the conductivity of each electrolyte was subsequently measured using conventional techniques. As can been seen from the table below, the conductivity was not adversely affected by an increase in concentration of the dopant.

| Dopant Composition | Dopant Concentration (wt. %) | Electrolyte/ Salt | Conductivity (S/cm) |
| --- | --- | --- | --- |
| LPS | 0 | PC/LiAsF$_6$ | 0.0016 |
| LPS | 5 | PC/LiAsF$_6$ | 0.0020 |
| LPS | 10 | PC/LiAsF$_6$ | 0.0015 |
| LPS | 15 | PC/LiAsF$_6$ | 0.0020 |

Also, for purposes of the present disclosure, dopant 18 is present in the electrolyte at a concentration between approximately 0.5% and approximately 50% by weight of the electrolyte. Preferred concentrations range from approximately 2% to approximately 25% by weight of the electrolyte.

While dopant 18 has been disclosed as being fabricated from specific compounds, for illustrative purposes only, it will be understood that other fabrication materials are likewise contemplated for use, including derivatives of PMMA and LPS and compounds having similar chemical functionality—so long as the materials: 1) comprise a reservoir for controllably releasing salt into an electrolyte; 2) controllably regulate the internal pressure of an electrochemical cell; and/or 3) substantially preclude dendrite formation within an electrochemical cell.

Figure 2:
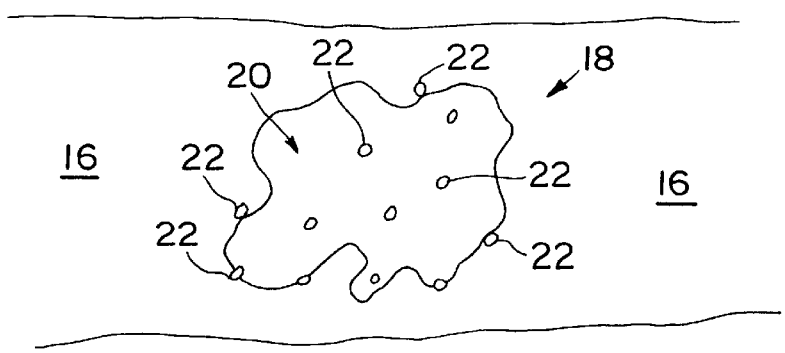
FIGS. 2 of the drawings is a schematic representation of a dopant associated with salt in accordance with the present invention.
Figure 3:
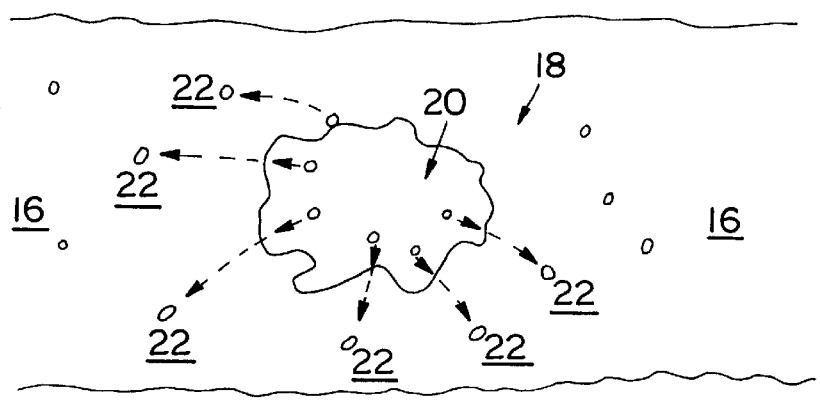
FIGS. 3 of the drawings is a schematic representations of a dopant releasing salt into an electrolyte in accordance with the present invention.

As shown in FIGS. 2 and 3, reservoir 20 accommodates salt 22 in and/or on dopant 18. Salts 22 may comprise any substance that contributes to the transmission of electrical current within the electrolyte including, for example, $LiAsF_6$, $LiPF_6$, $LiCF_3SO_3$, $LiN(CF_3SO_2)_3$, $LiBF_4$, or $LiClO_4$. During cell operation, the native salt within the electrolyte becomes depleted, thereby creating an area of relatively low salt concentration within the electrolyte. Salts 22 are controllably released (as function of the concentration of the salt the electrolyte) into the electrolyte, to in turn, replenish the salt to approximately the original concentration of, for example, 1.0 molar. It will be understood that Dopant 18 is charged with salts 22 by mixing the two components together prior to association with electrolyte 16.

Figure 4A:
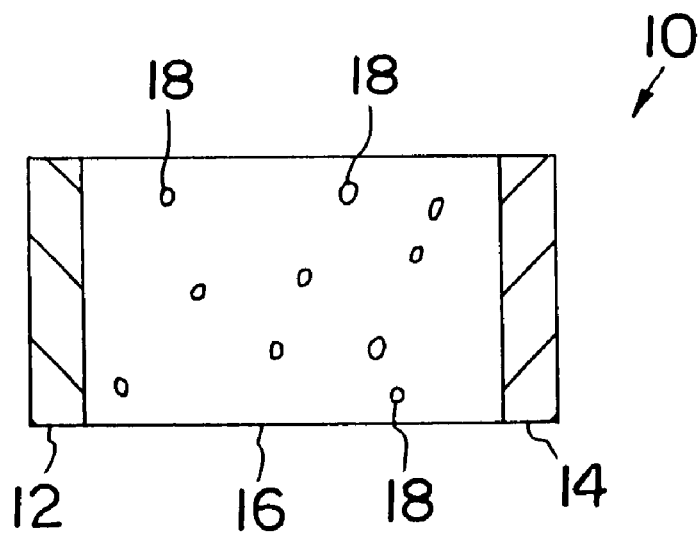
FIGS. 4A–4B of the drawings is a fragmented schematic representation of an electrochemical cell fabricated in accordance with the present invention showing, among other things, the swelling of a dopant in an electrolyte.
Figure 4B:
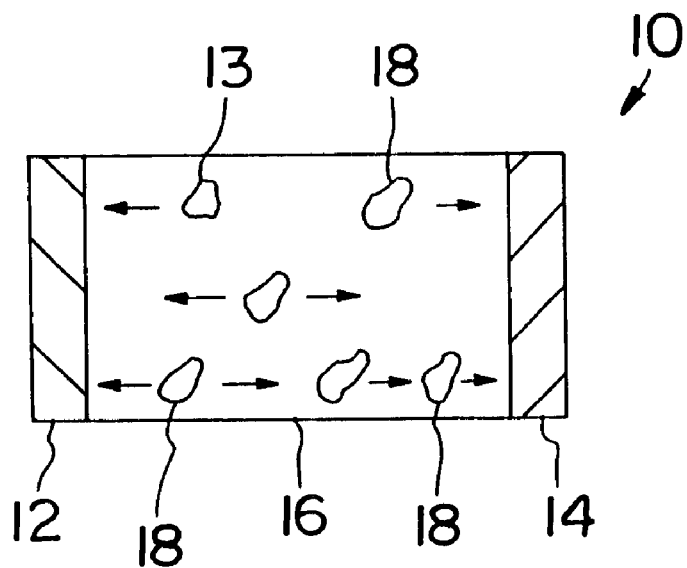

As shown in FIGS. 4A–4B, dopant 18 also controls the internal pressure within the cell, to in turn, ensure proper contact between, for example, current collector 15 and the active material layers of electrode 14. In particular, dopant 18 swells when associated with a solvent contained within the electrolyte. The swelling causes increased pressure within the cell, the degree of which can be controlled by several factors, including the concentration of dopant 18, the volume of solvent present in electrolyte 16, and the temperature of the environment in which electrochemical cell 10 is utilized. Preferably, dopant 18 swells to maintain an internal cell pressure no less than the pressure external to the battery.

Dopant 18 also substantially precludes the formation of dendrites at the interface between, for example, electrode 12 and electrolyte 16. The dopant can form what is conventionally known in the art as a passivating layer near the electrode/electrolyte interface. Passivation layers are disclosed in U.S. Pat. No. 5,853,917, the entirely of which is hereby incorporated herein by reference.

Although not shown, dopant 18 also increases the mechanical integrity of electrolyte 16, and in turn, electrochemical cell 10. In particular, dopant 18 is relatively viscous and elastic, which mechanically reinforces electrolyte 16 from deformation due to external stresses that are imparted upon the electrolyte during cell fabrication, such as during cutting, stacking, and/or bending.

The present invention is also directed to a process for fabricating an electrochemical cell comprising the following steps: First, electrodes 12 and 14 are fabricated using conventional techniques. Second, dopant 18 is associated with electrolyte 16 by simple addition, which, in turn, increases the viscosity and elasticity of electrolyte 16. Third, electrolyte 16 having the dopant is controllably applied to at least a portion of first electrode 12 by, for example, spraying, dipping, and/or coating. Fourth, electrode 14 is associated with electrolyte 16. Finally, electrochemical cell 10 is at least partially cured using conventional cell curing techniques.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. An electrochemical cell comprising:
    a first electrode and a second electrode;
    an electrolyte; and
    a dopant associated with the electrolyte, wherein the dopant comprises a reservoir for controllably releasing salt into the electrolyte.

2. The electrochemical cell according to claim 1, further comprising means for controllably regulating internal pressure of the electrochemical cell.

3. The electrochemical cell according to claim 2, wherein the pressure regulating means comprises the dopant.

4. The electrochemical cell according to claim 1, further comprising means for substantially precluding dendrite formation within the cell.

5. The electrochemical cell according to claim 4, wherein the dendrite preclusion means comprises the dopant.

6. The electrochemical cell according to claim 1, wherein the dopant is selected from the group consisting essentially of poly(methyl methacrylate), lithium polysilicate, and mixtures thereof.

7. The electrochemical cell according to claim 6, wherein the reservoir of the dopant contains a salt selected from the group consisting essentially of $LiAsF_6$, $LiPF_6$, $LiCF_3SO_3$, $LiN(CF_3SO_2)_3$, $LiBF_4$, $LiClO_4$, and mixtures thereof.

8. The electrochemical cell according to claim 6, wherein the concentration of the dopant ranges from approximately 0.5% to approximately 50% by weight of the electrolyte.

9. The electrochemical cell according to claim 8, wherein the concentration of the dopant ranges from approximately 2% to approximately 25% by weight of the electrolyte.

10. The electrochemical cell according to claim 6, wherein the molecular weight of the poly(methyl methacrylate) ranges from approximately 750,000 to approximately 1,000,000.

11. An electrochemical cell comprising:
    a first electrode and a second electrode;
    an electrolyte; and
    a dopant associated with the electrolyte, wherein the dopant comprises a reservoir for controllably releasing salt into the electrolyte, and wherein the dopant comprises means for controllably regulating internal pressure of the electrochemical cell.

12. The electrochemical cell according to claim 11, further comprising means for substantially precluding dendrite formation within the cell.

13. The electrochemical cell according to claim 12, wherein dendrite preclusion means comprises the dopant.

14. The electrochemical cell according to claim 11, wherein the dopant is selected from the group consisting essentially of poly(methyl methacrylate), lithium polysilicate, and mixtures thereof.

15. The electrochemical cell according to claim 14, wherein the concentration of the dopant ranges from approximately 0.5% to approximately 50% by weight of the electrolyte.

16. The electrochemical cell according to claim 15, wherein the concentration of the dopant ranges from approximately 2% to approximately 25% by weight of the electrolyte.

17. The electrochemical cell according to claim 14, wherein the molecular weight of the poly(methyl methacrylate) ranges from approximately 750,000 to approximately 1,000,000.

18. An electrochemical cell comprising:
    a first electrode and a second electrode;
    an electrolyte; and
    a dopant associated with the electrolyte, wherein the dopant comprises:
        a reservoir for controllably releasing salt into the electrolyte;
        means for controllably regulating internal pressure of the electrochemical cell; and
        means for substantially precluding dendrite formation within the cell.

19. The electrochemical cell according to claim 18, wherein at least one of the pressure regulating means, and the dendrite preclusion means comprises the dopant.

20. The electrochemical cell according to claim 18, wherein the dopant is selected from the group consisting essentially of poly(methyl methacrylate), lithium polysilicate, and mixtures thereof.

21. The electrochemical cell according to claim 20, wherein the reservoir of the dopant contains a salt selected from the group consisting essentially of $LiAsF_6$, $LiPF_6$, $LiCF_3SO_3$, $LiN(CF_3SO_2)_3$, $LiBF_4$, $LiClO_4$, and mixtures thereof.

22. The electrochemical cell according to claim 20, wherein the concentration of the dopant ranges from approximately 0.5% to approximately 50% by weight of the electrolyte.

23. The electrochemical cell according to claim 22, wherein the concentration of the dopant ranges from approximately 2% to approximately 25% by weight of the electrolyte.

24. The electrochemical cell according to claim 20, wherein the molecular weight of the poly(methyl methacrylate) ranges from approximately 750,000 to approximately 1,000,000.

25. A process for fabricating an electrochemical cell comprising the steps of:

fabricating a first electrode and a second electrode;

associating a dopant with an electrolyte, wherein the dopant comprises a reservoir for controllably releasing salt into the electrolyte;

controllably applying the electrolyte to at least a portion of the first electrode;

associating a second electrode with the electrolyte; and at least partially curing the electrolyte.

26. An electrochemical cell fabricated according to the process of claim 25.

27. An electrochemical process within an electrochemical cell comprising the steps of:

cycling an electrochemical cell having a first electrode, a second electrode, an electrolyte comprising a salt, and a dopant, wherein the dopant comprises a reservoir for controllably releasing salt into the electrolyte;

consuming a portion of salt within the electrolyte; and controllably releasing a salt from the dopant into the electrolyte.

28. The electrochemical process according to claim 27, further comprising the step of controllably regulating the internal pressure of the electrochemical cell.

29. The electrochemical process according to claim 27, further comprising the step of substantially precluding dendrite formation within the electrochemical cell.

* * * * *